(No Model.)
R. PAPENDELL.
STETHOSCOPE.
No. 599,064.                     Patented Feb. 15, 1898.
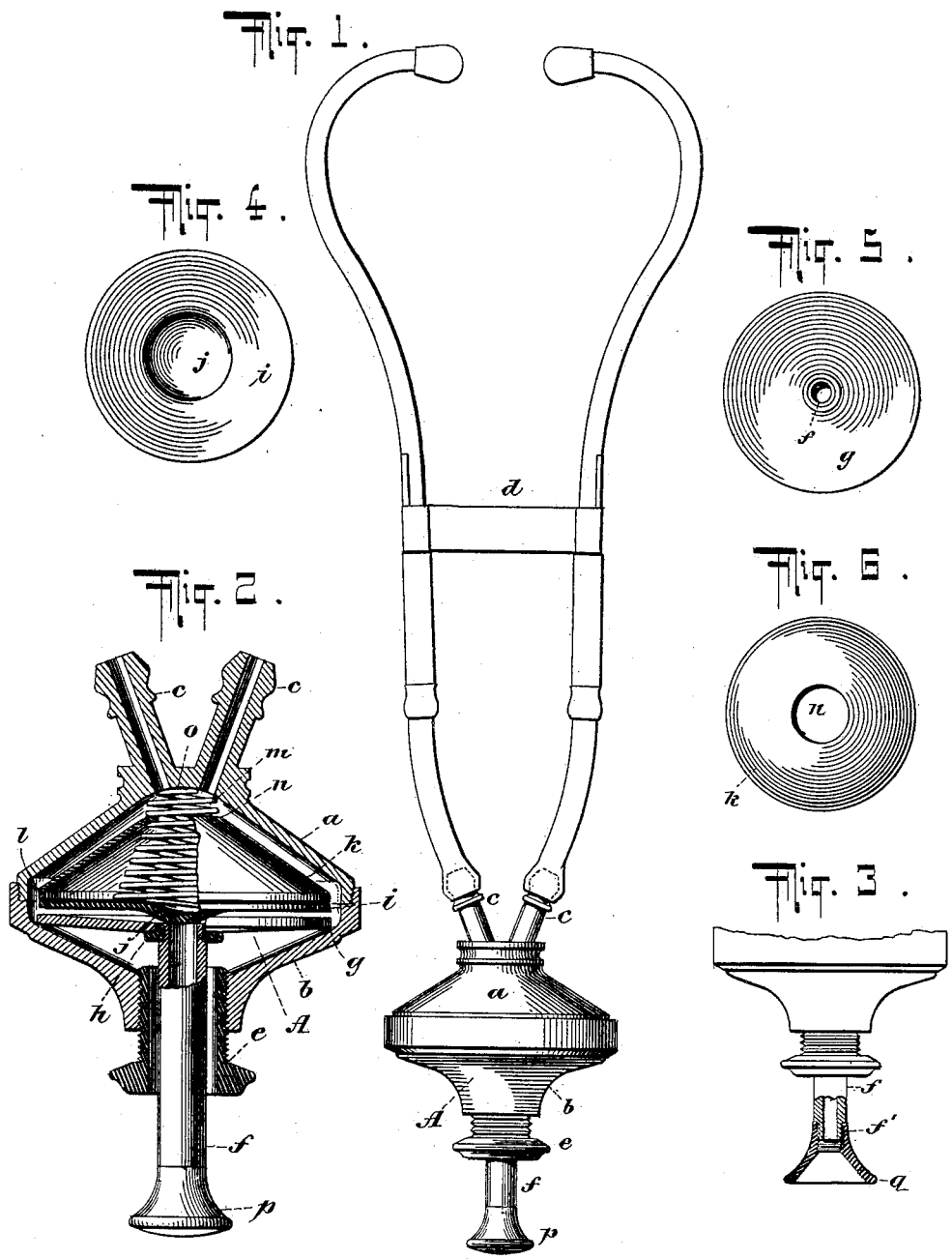
WITNESSES:                                    INVENTOR
Gustave Dieterich.                            Robert Papendell
Fred C. Maass                                 BY Briesen & Knauth
                                              ATTORNEYS

UNITED STATES PATENT OFFICE.

ROBERT PAPENDELL, OF BROOKLYN, NEW YORK, ASSIGNOR TO CHARLES J. TAGLIABUE, OF SAME PLACE.

STETHOSCOPE.

SPECIFICATION forming part of Letters Patent No. 599,064, dated February 15, 1898.

Application filed February 8, 1897. Serial No. 622,443. (No model.)

*To all whom it may concern:*

Be it known that I, ROBERT PAPENDELL, a resident of Brooklyn, Kings county, State of New York, have invented certain new and useful Improvements in Stethoscopes, of which the following is a full, clear, and exact description.

This invention relates to stethoscopes, and has for its object to produce a delicate and sensitive stethoscope and is embodied in a construction hereinafter set forth and claimed.

My invention will be understood by referring to the accompanying drawings, forming part hereof, in which—

Figure 1 is a side view of a stethoscope embodying my invention. Fig. 2 is an enlarged longitudinal section thereof, showing the interior construction. Fig. 3 is a sectional detail view showing a modified form of stem or tip hereinafter described. Fig. 4 is a plan view of the vibratory diaphragm. Fig. 5 is a plan view of the supplemental diaphragm, and Fig. 6 is a plan view of the resonator.

Referring to the drawings, $a$ is the rear section of the stethoscope-casing, and $b$ the front section thereof, which sections are shown as hollow cones, secured together by their edges. The vibratory parts of the stethoscope are contained within this casing. The rear section of the casing may be provided with nipples $c\,c$, to which any suitable sound-conducting device D may be attached. The front section $b$ of the casing is provided with a screw-threaded aperture in which an exteriorly-screw-threaded bushing $e$ works. A stem $f$ passes through the bushing and extends into the casing and carries on its end a diaphragm $g$, which, while rigidly attached to the stem, is loose in the casing. This diaphragm may, however, be a mere spider or other device which will contact with the interior of the casing so as to support the stem loosely in the said casing, and wherever in this specification I refer to the said diaphragm $g$ I mean to thereby include such structures as spiders and the like which will rest in the casing and support the stem $f$. In the present instance the diaphragm $g$ is shown as encircling a collar $h$, screwed upon the stem or localizer $f$. In the rear of the diaphragm $g$ is a loose diaphragm $i$, which in the present instance constitutes the auditory diaphragm, and is shown as provided with a central bulge $j$. In rear of the diaphragm is a bodily-movable loose resonator $k$, shown in the present instance as conoidal, truncated at the top, and provided with a projecting flange $l$, which bears against the auditory diaphragm $i$. Bearing against the auditory diaphragm and forcing the same down into contact with the stem is a spiral spring $m$, which spring passes through the aperture $n$ at the top of the truncated conoidal resonator $k$, and bears against the rear wall $o$ of the chamber A, constituted by the front and rear sections $a\,b$.

By referring to Fig. 3 it will be noted that the stem $f$ is provided with means for removably securing a tip thereto, shown in the present instance as a screw-threaded end $f'$. Upon this screw-threaded end various characters of tips may be employed. For instance, the percussion or concussion detecting tip $p$ (shown in Fig. 2) or the arterial exploring tip $q$ (shown in Fig. 3) may be interchangeably used.

The instrument has been found to be a very efficient diagnostic instrument when applied to respiratory, vascular, and thoracic and other organs, being quite well adapted to detect and properly conduct sounds emanating from the said organs in such a manner that sounds of different characters proceeding from the said organs may be readily distinguished one from the other without at the same time being so delicate in operation as to confuse the various noises, as is done by some very sensitive instruments heretofore devised. The sleeve $e$ may be adjusted into the casing to regulate the action of the diaphragm $g$.

The operation of the device will be obvious to one skilled in the art, who will readily discern that the stem will convey the sounds to the auditory diaphragm $i$, which being free to move and in contact with the resonator $k$ the sounds brought by the stem to the said diaphragm will be considerably amplified and will pass to the ear of the diagnostician by means of the auditory apparatus $d$ in the usual manner. It will be observed that the resonating apparatus, consisting of the diaphragm $i$, bell $k$, and spring $m$, is entirely free to swing or oscillate in any desired direction, so that the stem $f$, passing loosely through the sleeve, need not always be perpendicular to the plane of the diaphragm $i$, as shown, but the instrument may be placed against the body in almost any position, the united structures—to wit, the stem $f$ and diaphragm $g$—swinging upon an edge of the diaphragm as a center. Indeed, the possibilities and advantages of operation of this structure are multitudinous. When the stem and diaphragm $g$ are swung as aforesaid, the auditory diaphragm and resonating bell may or may not follow them in their movements, as the bulge $j$ of the auditory diaphragm, resting against the stem, will allow the stem to move freely, or in default of this the spring $m$, which presses the auditory diaphragm against the stem and the resonating bell against the diaphragm, will permit the resonating bell and diaphragm to swing freely in the manner before outlined.

What I claim as new, and desire to secure by Letters Patent, is—

1. In a stethoscope, the combination of an enveloping casing, a loose stem, a diaphragm secured to the loose stem, a loosely-supported auditory diaphragm located within the casing and coöperating with the said stem and a sound-conducting device for conducting sound from the enveloping casing.

2. In a stethoscope, the combination of an enveloping casing, an auditory diaphragm loosely supported in the said casing, a diaphragm $g$ coöperating therewith and carrying a stem $f$, a resonating bell coöperating with the auditory diaphragm and freely movable in the casing and a sound-conducting device for conducting sound from the casing.

3. In a stethoscope, the combination of an enveloping casing, an auditory diaphragm, a diaphragm loosely supported in the casing and coöperating with the auditory diaphragm, a loose stem coöperating with the auditory diaphragm and a sound-conducting device for conducting sound from the casing.

4. In a stethoscope, the combination of a loose stem $f$, a diaphragm $g$ secured thereto, a loosely-supported auditory diaphragm coöperating with the said stem, a loosely-mounted resonating bell in contact with the auditory diaphragm and a sound-conducting device for conducting sound from the resonating bell.

5. In a stethoscope, the combination of a loose stem $f$, a loosely-supported diaphragm $g$ secured thereto, a loosely-supported auditory diaphragm coöperating with the said stem, a loosely-vibrating resonating bell in contact with the auditory diaphragm and means for holding the diaphragm and bell in contact.

6. In a stethoscope, the combination of a stem, a diaphragm $g$ secured to the said stem and freely movable bodily, a loose auditory diaphragm $i$ having a bulge $j$ adapted to coöperate with the stem and means for maintaining the diaphragm and stem in operative relation.

7. In a stethoscope, the combination of a resonator comprising a bell or chamber and a diaphragm $i$, both the said bell and diaphragm being loose and freely movable and a stem for conveying sound to the said resonator.

8. In a stethoscope, the combination of an enveloping casing, a frusto-conical resonating bell inclosed and free to oscillate bodily therein, a diaphragm in vibratory connection therewith and a stem for conveying sound to the diaphragm.

9. In a stethoscope, the combination of an enveloping casing, a freely-oscillating loose resonator contained therein and a stem for conveying sounds to the said resonator.

10. In a stethoscope, the combination with an enveloping casing and sound-conducting means of a resonator comprising a plurality of parts inclosing a space to form a resonating chamber, the said parts being contained within the casing and freely movable bodily therein, substantially as described.

11. In a stethoscope, the combination of a casing, a bodily-movable resonating chamber contained therein combined with means for conducting minute sounds to and from the said resonating chamber, substantially as described.

12. In a stethoscope, the combination of a bulged diaphragm combined with a frusto-conical resonating bell $k$ and a spring $m$ passing through the bell and bearing upon the outside of the said bell.

13. In a stethoscope, the combination of a diaphragm, a resonating bell and a pyramidal helical spring $m$ passing through an aperture in the bell and bearing both inside and outside of the said bell, substantially as described.

14. In a stethoscope, the combination with an auditory diaphragm of a freely-vibrating stem $f$ in proximity to the said diaphragm and a loose diaphragm for supporting the said stem.

15. In a stethoscopic instrument, the combination of an enveloping casing, a diaphragm oscillating bodily in the said casing and held steady when inactive by spring-pressure, a localizer in operative relation to the diaphragm and adapted to take up and transmit local sounds to the said diaphragm and a sound-conducting device for conducting sound from the diaphragm to the ear.

ROBERT PAPENDELL.

Witnesses:
GEO. E. MORSE,
MAURICE BLOCK.